Aug. 2, 1966     A. D. LANTZ     3,264,401
SUPPRESSORS FOR TRANSMISSION LINE CONDUCTORS
Filed Oct. 29, 1963

INVENTOR.
ALPHA D. LANTZ
BY Kenneth W. Miller
ATTORNEY

United States Patent Office 3,264,401
Patented August 2, 1966

3,264,401
SUPPRESSORS FOR TRANSMISSION LINE
CONDUCTORS
Alpha D. Lantz, Barberton, Ohio, assignor to The Ohio
Brass Company, Mansfield, Ohio, a corporation of New
Jersey
Filed Oct. 29, 1963, Ser. No. 319,737
3 Claims. (Cl. 174—42)

This patent relates to transmission lines and transmission line conductors and, more particuarly, to apparatus for damping vibrations in transmission line conductors.

A principal object of the invention is to stabilize transmission line conductors.

Another object of the invention is to limit periodic movement of suspended transmission line conductors in the longitudinal direction of the conductor cable.

Still another object of the invention is to eliminate conductor and insulator damage due to uncontrolled vibrations in transmission line conductors.

It is known that under certain conditions of icing, loading, wind velocity, and the like, suspended cables in overhead transmission lines are excited into violent transverse vibrations which may grow in amplitude and intensity so that the line is ultimately destroyed. The various factors involved have been analyzed to some extent, and it is known that under certain circumstances the transverse vibrations generate waves which travel along the cable and are reflected at the suspension points, often with great damage to the suspension apparatus.

The present invention delates to means for damping or dissipating the energy of such traveling waves. Particularly, it is contemplated that a dissipation of the forces involved during early stages of the growth of the wave will suppress the vibrations and resulting waves, or at least prevent growth thereof to destructive levels.

The apparatus of the invention contemplates providing fluid dampers at suspension points, e.g. at towers or other supporting structures, where the conductor cable is carried from the tower by means of susupension insulators and conductor clamps or like apparatus. The dampers are connected between the conductor cable or associated parts of the conductor assembly and a reference member which is held in a fixed position adjacent the conductor by means of strut insulators fixed to the tower or other supporting structure.

The apparatus disclosed herein is similar to the apparatus disclosed in J. J. Taylor application, Serial No. 319,186, filed October 28, 1963. However, the present apparatus differs from the apparatus of that application in the arrangement and support of the reference member with respect to the fixed structure and in the arrangement of the dampers between the conductor apparatus and the reference member.

According to the disclosure of the present application, the reference member and the outward parts of the strut insulators attached thereto are carried, with the conductor apparatus, by the suspension insulators. Accordingly, the strut insulators are supported at both extremities thereof so that cantilever stresses are greatly reduced and lighter and less expensive strut insulators may be utilized in practicing the invention.

The invention, together with further objects, features, and advantages thereof, will be understood from the following detailed specification and claims, taken in connection with the appended drawings in which:

Figure 1:
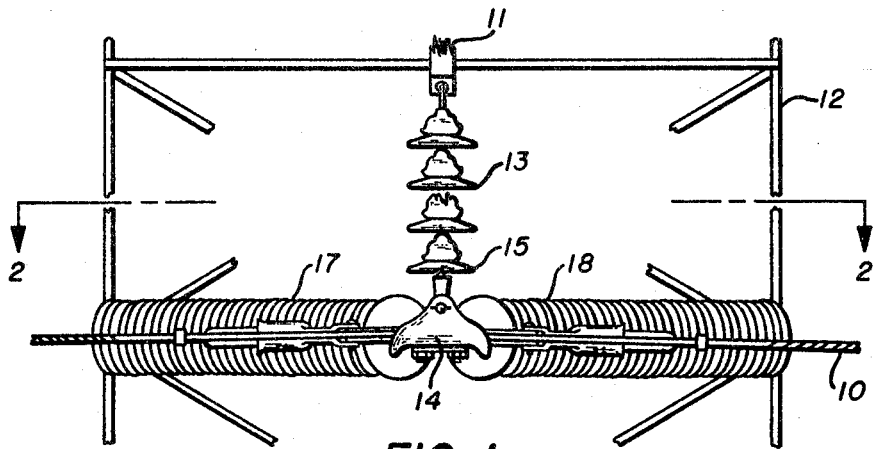
FIG. 1 illustrates the invention and shows a tower and suspension apparatus for a transmission line conductor in front elevation view.

Referring now to FIG. 1, the transmission line apparatus of the invention comprises a conductor cable 10 which is suspended from an arm 11 of a tower 12 by a string of suspension insulators 13 connected betwen the arm 11 and a conductor clamp 14 which carries the cable 10. The cable 10 is part of a multiple conductor system comprising the transmission line, the remaining conductors being carried from cross arms similar to the arm 11 in laterally and/or vertically spaced relation to the cable 10.

The string of suspension insulators 13 is constituted by a plurality of unitary insulators 15, of known design, having interconnecting ball-socket or clevis-tongue connectors. The conductor clamp 14 may be conveniently constituted as a suspension clamp, as shown, as a trunnion clamp, reinforced elastic grip, or other conductor holding means.

The conductor cable 10 is subject to transverse vibrations as a result of excitation by wind, ice unloading, or other natural or artificially produced forces. Such vibrations occur at certain natural frequencies and may under proper conditions be imparted to the cable as movements in the longitudinal direction of the cable. Under such circumstances, the suspension clamp 14 and insulators at the lower extremity of the string of insulators 13 undergo longitudinally oscillating movement with respect to the support structure.

In accordance with the present invention, a platform or reference member 16 is supported adjacent the cable 10 and the clamp 14 by an arrangement including two strut insulators 17 and 18. The insulators 17 and 18 are attached to the tower 12 by means of two anchors 19 and 20 which are pivotally connected to two support members 21 and 22 at longitudinally spaced parts of the frame of the tower horizontally opposite the conductor clamp 14. The outer ends of the insulators 17 and 18 are attached, at the respective ends thereof, to the support members 21 and 22 and to flange members 23 and 24 which form a part of the reference member 16.

The reference member 16 is carried by a plate 25 secured to the under side of the conductor clamp 14 by the fastener bolts 26 of the clamp. The reference member 16 rides upon the plate 25 and has a pin 28 which extends into and through a slot 29 in the plate 25. The slot 29 is disposed parallel to the cable 10 and extends in the longitudinal direction of the cable.

The strut insulators each comprise a body of porcelain or other rigid insulating material having metal flanges at the extremities thereof for attachment to the flanges on the cooperating parts 16, 21, and 22. The strut insulators may be unitary or composite within the spirit of the invention.

The cable 10 is coupled to the reference member 16 by means of two linear dampers 30 and 31 which are connected between the two longitudinal extremities of the member 16 and to the adjacent portions of the cable outwardly from the two extremities of the member 16 respectively. Two conductor clamps 32 and 33, comprising metal straps extending about the cable and compressively secured thereto, are utilized as fittings for attachment to and by the dampers 30 and 31. The dampers are pivotally connected to the cable clamps and to the reference member by suitable clevis-pin fittings for relative pivotal movement of the respective members.

Because of the rigidity of the strut insulators 17 and 18 and the divergent arrangement of those insulators in the horizontal plane, the reference member 16 is fixed against movement in the horizontal direction. Accordingly, the parts of the dampers 30 and 31 which are attached to the member 16 are fixed against movement in the longitudinal direction of the cable and the cable 10, conductor clamp 14, and insulators 13 are held against movement in the transverse direction of the cable.

Figure 2:
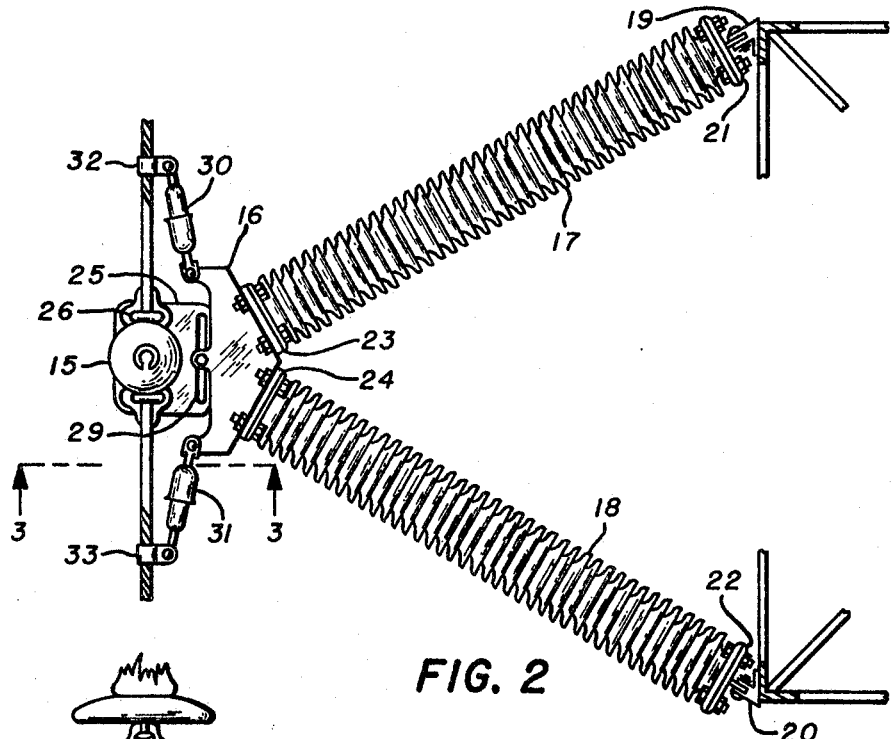
FIG. 2 is a top plan view of the apparatus of FIG. 1, taken in the direction 2—2 in FIG. 1.
Figure 3:
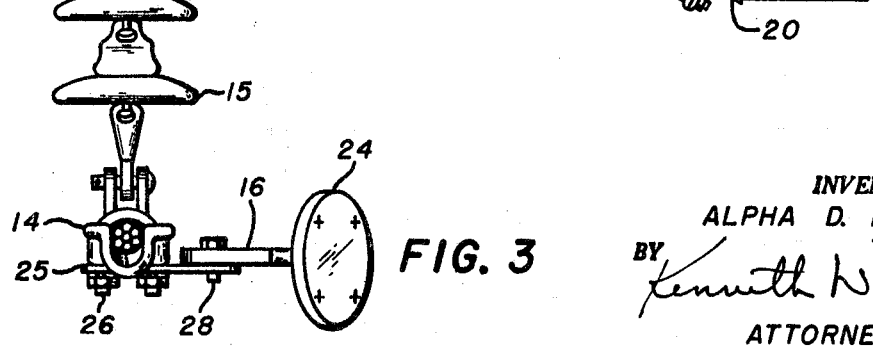
FIG. 3 is a partial side elevation view of the apparatus of FIG. 1 and FIG. 2, taken in the direction 3—3 in FIG. 2.

As will be evident from FIG. 2, movement of the cable 10 in either longitudinal direction results in extension of one damper and retraction of the remaining damper. Accordingly, the resistance to longitudinal movement of the cable 10 relative to the reference member 16 results in substantial dissipation of the mechanical energies of the system. It is important, of course, that the dynamic response characteristics of the system, which includes the cable, suspension insulators, and the dampers 30 and 31, be such that the oscillating movements of the cable are transmitted as relative linear movements of the parts of the dampers 30 and 31.

The cooperation of the insulators 17 and 18 with the string of suspension insulators 13, due to the weight of that portion of the strut insulators carried by the suspension insulators, is effective to provide a desirable constraint upon the conductor clamp 14 and cable 10, and the apparatus may be designed to limit the forces exerted particularly upon the suspension insulators 15.

The dampers 30 and 31 are known hydraulic or pneumatic dampers and may include telescopic cylinder and piston elements with suitable valve means for modifying the resistance to fluid flow in one or both directions of relative movement of the pistons and cylinder. Examples of hydraulic damping devices are shown in United States Patent 3,070,191, issued December 25, 1962, and in the references cited therein.

It is to be understood that the foregoing description is not intended to restrict the scope of the invention and that various rearrangements of the parts and modifications of the design may be resorted to. The following claims are directed to combinations of elements which embody the invention or inventions of this application.

I claim:
1. Apparatus for an electric power transmission system in which there is a tower, conductor means suspended from the tower comprising a conductor cable, a conductor clamp holding the cable, and suspension insulators connected to the conductor clamp and to the tower carrying the conductor means from the tower, the combination with the conductor means and suspension insulators which comprises a reference member adjacent the cable, two rigid strut insulators extending between the reference member and the tower with means connecting the strut insulators to the tower at points spaced in the longitudinal direction of the cable and fixing the reference member to the tower in the longitudinal and transverse directions of the cable, and means connecting the reference member to the conductor clamp for carrying the reference member and strut insulators from the suspension insulators, the last-named means comprising interengaging means for movement of the conductor means relative to the reference member in the longitudinal direction of the cable.

2. Apparatus in accordance with claim 1, with means for suppressing movement of the conductor means in the longitudinal direction of the cable comprising a fluid damper connected between the reference member and an adjacent portion of the conductor means.

3. Apparatus in accordance with claim 2, in which the means connecting the reference member to the conductor clamp includes a member attached to the conductor clamp and interengaging pin and slot means on the said connecting means member and on the reference member, and the slot extending in the direction of the conductor for permitting movement in the longitudinal direction thereof with constraint in the transverse direction thereof.

References Cited by the Examiner

UNITED STATES PATENTS 1,160,544  11/1915  Steinberger _____ 174—148 X

FOREIGN PATENTS 684,740  12/1939  Germany.
341,340   6/1936  Italy.

OTHER REFERENCES

German printed application, 1,099,026, February 1961.

LARAMIE E. ASKIN, *Primary Examiner.*

JOHN F. BURNS, *Examiner.*

J. F. RUGGIERO, *Assistant Examiner.*